(12) United States Patent
Marti

(10) Patent No.: US 9,221,607 B2
(45) Date of Patent: Dec. 29, 2015

(54) STORE FOR TIRE CASINGS

(75) Inventor: Francis Marti, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 258 days.

(21) Appl. No.: 13/878,160

(22) PCT Filed: Oct. 7, 2011

(86) PCT No.: PCT/FR2011/052350
§ 371 (c)(1),
(2), (4) Date: Aug. 28, 2013

(87) PCT Pub. No.: WO2012/045987
PCT Pub. Date: Apr. 12, 2012

(65) Prior Publication Data
US 2013/0336750 A1 Dec. 19, 2013

(30) Foreign Application Priority Data
Oct. 8, 2010 (FR) ...................................... 10 58191

(51) Int. Cl.
B65G 1/08 (2006.01)
B29D 30/00 (2006.01)
B65G 1/04 (2006.01)
B65G 47/88 (2006.01)

(52) U.S. Cl.
CPC .............. *B65G 1/08* (2013.01); *B29D 30/0016* (2013.01); *B65G 1/0435* (2013.01); *B65G 47/8846* (2013.01); *B29D 2030/0022* (2013.01); *B65G 2201/0273* (2013.01)

(58) Field of Classification Search
CPC .. B29D 30/0016; B65G 1/08; B65G 47/8846; B65G 1/0435
USPC .................................. 414/276, 278, 277, 281
See application file for complete search history.

(56) References Cited

U.S. PATENT DOCUMENTS

| 1,703,773 | A | * | 2/1929 | Lee ................................. 193/38 |
| 3,664,534 | A |   | 5/1972 | Hunter |
| 3,674,159 | A | * | 7/1972 | Lemelson ..................... 414/276 |
| 3,750,804 | A | * | 8/1973 | Lemelson ..................... 414/276 |
| 3,753,507 | A |   | 8/1973 | James et al. |
| 3,771,633 | A | * | 11/1973 | Bezrukov et al. ........... 193/35 A |
| 3,863,778 | A | * | 2/1975 | Martin, Sr. ................ 414/331.11 |
| 3,917,044 | A | * | 11/1975 | Brown ............................. 193/40 |
| 4,212,381 | A | * | 7/1980 | Cook .............................. 193/40 |

(Continued)

FOREIGN PATENT DOCUMENTS

| DE | 202 14 339 | 2/2003 |
| DE | 102012109162 A1 * | 3/2014 |
| EP | 0 795 495 | 9/1997 |
| FR | 1 346 407 | 12/1963 |

(Continued)

*Primary Examiner* — Kaitlin Joerger
(74) *Attorney, Agent, or Firm* — Cozen O'Connor

(57) ABSTRACT

Storing vehicle tire casings (4) by providing at least two channels (12) for storing casings, each one having an end stop (22), and a casing conveyor, capable of coming into alignment with any of the channels and containing a platform (32) that can receive a casing. A casing located in the channel is lifted until it is higher than the end stop. The lifting is done by a roller (46), which is mounted in such a way that it can move in the vertical direction in relation to the platform.

15 Claims, 3 Drawing Sheets

(56) References Cited

U.S. PATENT DOCUMENTS 4,829,749 A * 5/1989 Hiyama et al. .................. 53/538
2006/0070847 A1 * 4/2006 Besch et al. ............... 198/347.4

FOREIGN PATENT DOCUMENTS

| JP | 52055179 A | * | 5/1977 | ................ B65G 1/14 |
| JP | 02062304 A | * | 3/1990 | ................ B65G 1/04 |

* cited by examiner

STORE FOR TIRE CASINGS

RELATED APPLICATIONS

This is a U.S. national stage of application No. PCT/FR2011/052350 filed on Oct. 7, 2011.

This patent application claims the priority of French application no. 10/58191 filed Oct. 8, 2010, the disclosure content of which is hereby incorporated by reference.

FIELD OF THE INVENTION

The invention relates to the manufacture of vehicle tires and in particular to the storage and the handling of tire casings.

BACKGROUND OF THE INVENTION

The manufacture of tires involves the production of a blank containing in particular raw rubber. The blank is subjected to a curing stage for the vulcanization of the rubber. After curing, it is often necessary for the casings produced in this way to be stored temporarily, for example for the purpose of grouping them by model or by series for dispatch to the client. In fact, a single factory will generally produce different models of tires. It can also happen that tires which are not part of the same series and the same model are cured during the same period. It is therefore necessary to store them temporarily before collecting them together for dispatch.

Storage takes place, for example, in stores containing inclined channels. An entry conveyor places a casing in one of the channels. The casing is then displaced by gravity along the channel until it abuts against an end stop of an exit extremity of the channel or against the casings that have already accumulated there. To remove a casing from the store, an exit conveyor comes into alignment with the channel concerned. A mechanism of the channel lifts the casing, causing it to move past the end stop, and the casing is then transferred onto the conveyor. Alternatively, provision can be made for the end stop to be mounted movably between an active position and a retracted position and to be maneuvered by a mechanism of the channel. In either case, however, these mechanisms that are situated at the extremities of the respective channels are expensive.

SUMMARY OF THE INVENTION

One object of the invention is to reduce the cost of storing tire casings.

To accomplish this and other objects, one aspect of the present invention is directed to a store for vehicle tire casings, which contains:
  at least two channels for storing casings, each having a rectilinear end stop, intercepting a median vertical plane of the channel, exhibiting two longitudinal extremities and being uninterrupted from one to the other of the extremities, and
  a casing conveyor capable of coming into alignment with any of the channels and containing a platform capable of receiving a casing and means for lifting a casing that is located in the channel to a height greater than that of the end stop, the means containing a roller which is mounted movably in the vertical direction in relation to the platform.

Thus, the end stop makes the store particularly well adapted for the storage of tire casings. In fact, regardless of the width of the casing, which is rotationally symmetrical, the end stop provides it with support at a point situated in the vicinity of the median vertical plane of the channel or on the latter. This position remains substantially constant even if casings of different dimensions are stored in the channels. The removal of the casings by the conveyor is thus facilitated in this way. If, on the contrary, the end stop were to be interrupted in its middle portion, the casing would risk becoming trapped in the opening created in this way, which trapping would occur either during storage or during removal.

Furthermore, it is the conveyor itself, which lifts the casing present in the channel to a height greater than that of the end stop. This unique mechanism of the conveyor accordingly replaces all the mechanisms that are specific to each channel, which permits the costs to be reduced substantially. Furthermore, the roller permits each casing to be lifted easily and efficiently in order to cause it to move past the end stop without risking damage to it. In addition, the roller being mobile in the vertical direction in relation to the platform, it is not necessary to manoeuvre the latter in order to cause the roller to move past the end stop. This is advantageous because such a manoeuvre of the platform has proved to be relatively difficult and consumes a large quantity of energy.

Advantageously, the roller is movably mounted in translation in relation to the platform.

Provision can be made for the roller to be movably mounted in relation to the platform in such a way as to pass through an opening provided in each channel.

In this way, the roller is adapted to avoid the end stop by passing underneath in order to move past the opening provided in the receiving surface of the channel supporting the casings.

Advantageously, the roller is connected to the platform by a parallelogram mounting.

The mounting in question ensures the simple and precise guiding of the roller in relation to the channel and to the conveyor.

Preferably, the mounting defines two extremities of the travel of the roller and extends in its entirety beneath a loading plane of the platform regardless of the position of the roller.

The parallelogram mounting thus leaves the loading plane of the platform clear, which consequently remains free to receive casings of various dimensions, in particular of large diameter. It is possible in particular to load onto the platform a casing with dimensions greater than the platform and to give the latter a width lower than that of the channels.

Provision can be made for the store to contain means for displacing the roller in relation to the platform.

Advantageously, the means for lifting the casing contain a support, the roller being rotatably mounted in relation to the support.

Provision can be made for the store to contain means for setting the roller in rotation in relation to the support.

Thus, the roller which is used to lift the casing can also transfer it from the channel as far as the conveyor.

Preferably, the roller exhibits a length greater than half the width available in the channel for the casings.

The roller thus supports a large part of the width of the casing for the purpose of maintaining it in a stable manner while it lifts it, or transfers it onto the platform. In addition, if the diameter of the casing is much smaller than the width of the channel, the roller may properly lift and transfer the casing even if the latter is offset in relation to the median plane of the channel.

Advantageously, the end stop extends for more than half the width available in the channel for the casings.

Such an end stop permits casings of which the diameter is much smaller than this width to be stored in the channel.

Advantageously, the store contains a second casing conveyor adapted to come into alignment with an extremity of any of the channels opposite the end stop.

Another aspect of the invention relates to a method for handling vehicle tire casings, in which:
- a casing conveyor is displaced as far as a channel for storing casings, and
- the conveyor lifts a casing that is present in the channel to a height greater than that of an end stop of the channel.

Preferably, the conveyor transfers the casing onto the conveyor.

BRIEF DESCRIPTION OF THE DRAWINGS

Other characterizing features and advantages of the invention will become more evident in the following description given by way of example and without limitation with reference to the accompanying drawings, in which.

DETAILED DESCRIPTION OF THE DRAWINGS

Figure 1:
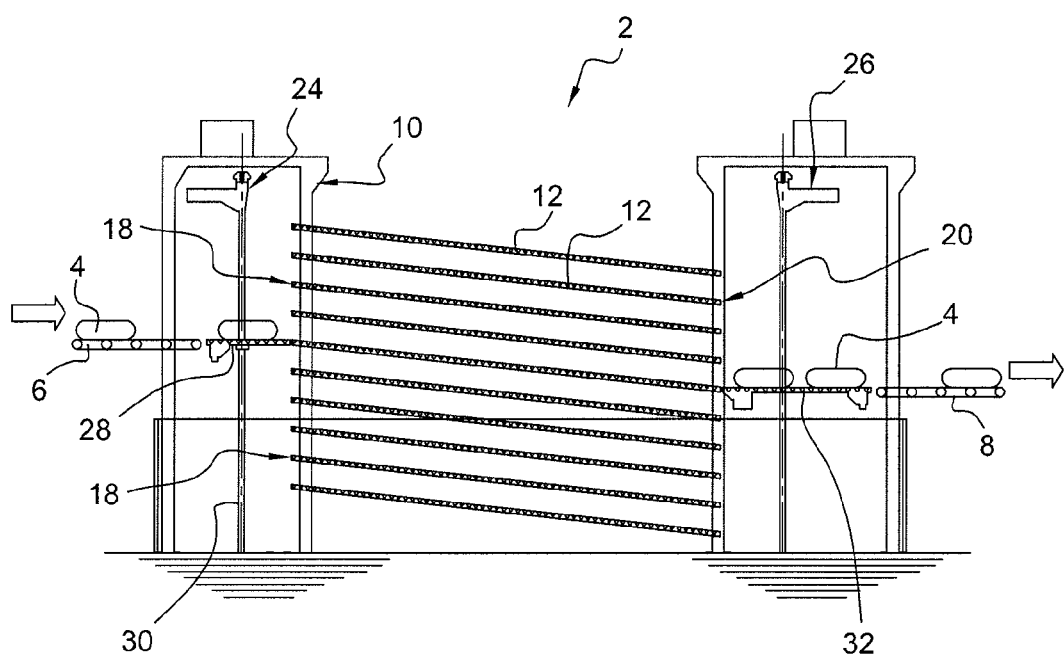
FIG. 1 is a view in vertical cross section of a store for tire casings intended for vehicle wheels according to the invention.

Illustrated in FIG. 1 is a store 2 for storing tire casings 4 intended for vehicle wheels.

The vehicles in question may be passenger vehicles, utility vehicles, light commercial vehicles, heavy goods vehicles or even civil engineering vehicles.

The casings 4 form finished or semi-finished tires. They contain vulcanized rubber, reinforcements and various additives. They have a generally toroidal form, which is that of the tire. The store 2 is interposed between an entry conveyor 6, by means of which the casings 4 are brought to the store, and an exit conveyor 8, by means of which the casings are carried away from the store. These two conveyors have fixed frames in relation to a frame 10 of the store 2.

Figure 5:
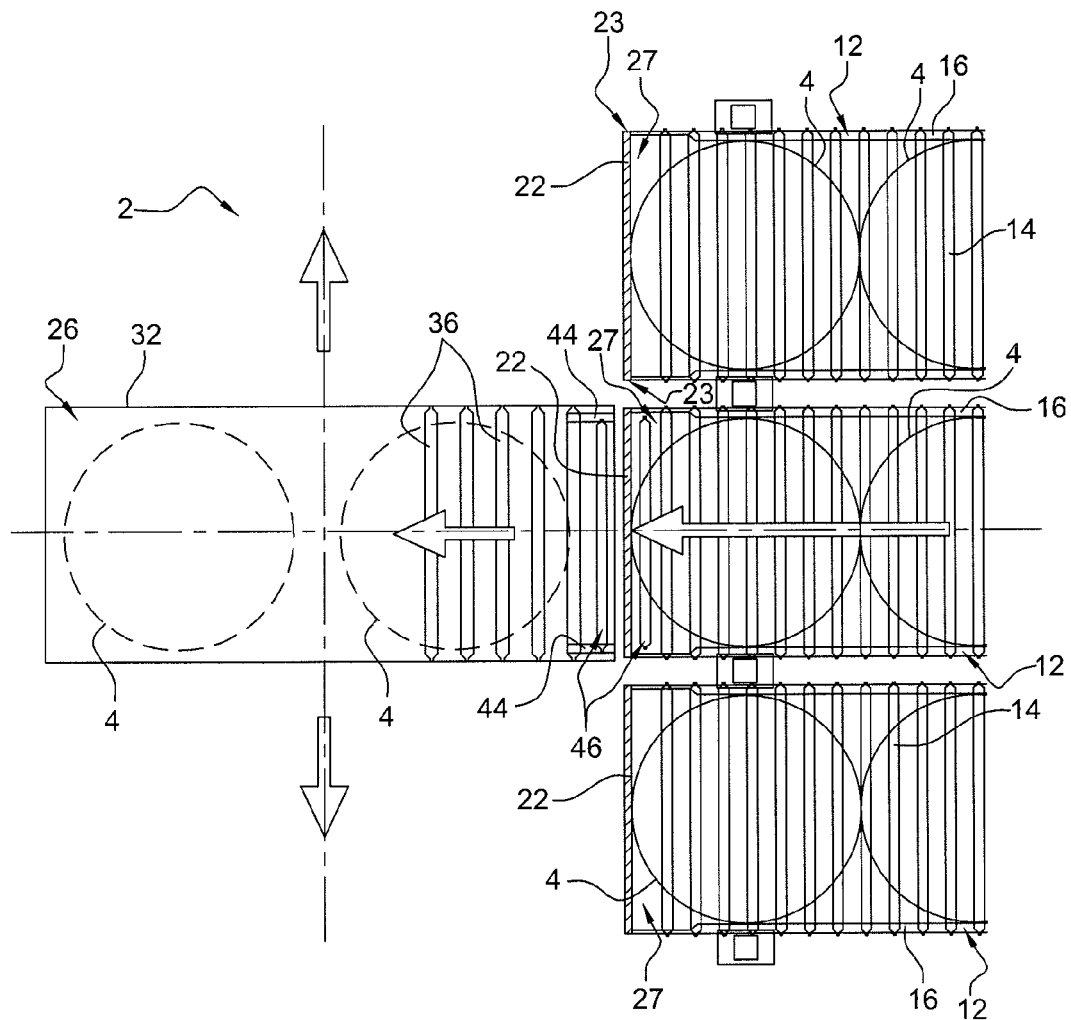
FIG. 5 is a plan view of the part of the store in FIGS. 2 and 4.

The store 2 contains a group of identical channels 12 arranged one above the other and one alongside the other in order to form vertical columns between them, for example being ten in number, and horizontal rows, for example also being ten in number. There is no restriction on the number of columns and rows. Only a single column of these channels is apparent in the sectional drawing in FIG. 1, the others being above and beyond the plane of the figure. FIG. 5 illustrates three contiguous channels 12 extending in the same horizontal row.

Each channel 12 contains an elongated support plane, defined by rollers 14 illustrated in FIGS. 2 to 5, being identical to each other and in alignment one behind the other, and of which the axes of rotation are coplanar. The rollers are mounted freely mobile (mounted loosely) in rotation in relation to a common frame 16 of the channel containing two longitudinal members supporting the rollers.

Each channel is inclined in such a way that its longitudinal direction forms an angle with the horizontal direction. Each channel thus exhibits an upper extremity 18, illustrated on the left in FIG. 1, and a lower extremity 20, illustrated on the right. All the channels exhibit the same inclination. In addition, the upper extremities of the channels extend in the same vertical plane. The same is true of their lower extremities 20. These are gravity-flow channels.

Each channel carries at its lower extremity 20 an end stop 22 projecting from the plane defined by the rollers 14 for receiving a casing 4, towards the top, in a direction precisely perpendicular to this support plane.

As can be seen in FIG. 5, the end stop 22 has an elongated rectilinear form in the horizontal direction. It thus extends higher than the rollers 14 for its entire length. The end stop 22 exhibits two horizontal extremities 23, between which it is uninterrupted. It extends symmetrically to either side of the median vertical plane of the channel which it intercepts and which forms the plane of symmetry of the latter. Therefore, it occupies in particular the median part of the extremity of the channel. The end stop has a length greater than half the width of the available channel for the casings. Here, this length even exceeds three quarters of this width, and even more, since the length of the end stop is equal to the total width of the channel.

The store 2 exhibits an entry conveyor 24 and an exit conveyor 26, interposed respectively between the entry conveyor 6 and the channels 12, and between the latter and the exit conveyor 8.

The entry conveyor 24 contains a platform 28 mounted movably in relation to the frame 10 sliding in the vertical direction and sliding in the horizontal direction parallel to the plane of the upper extremities. The store contains means for driving the platform for its displacement in relation to the frame. The platform is capable of movement, however, in order to come into alignment with the extremity of the conveyor 6 and into alignment with the upper extremity 18 of any of the channels 12. In the present example, the conveyor 24 contains a vertical mast 30, on which the platform 28 is mounted so as to slide freely, the mast furthermore being mounted displaceably in the horizontal direction in relation to the frame 10.

The exit conveyor 26 contains a platform 32 mounted movably in relation to the frame and driven in a similar manner. It may thus be positioned at will in alignment with the exit conveyor 8 or with the lower extremity 20 of any of the channels 12.

Figure 2:
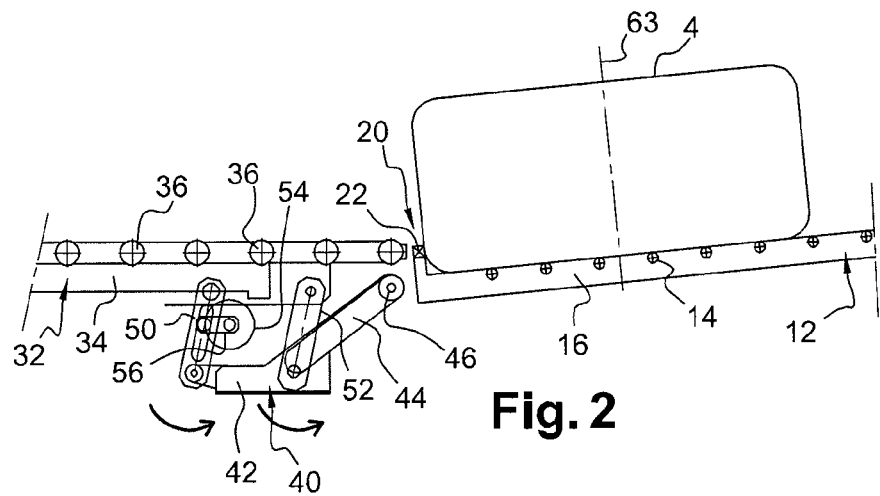
FIGS. 2 to 4 are three large-scale views of the lower extremity of a channel and of the exit conveyor of the store in FIG. 1, illustrating three stages of implementation of the method according to an embodiment of the invention.
Figure 3:
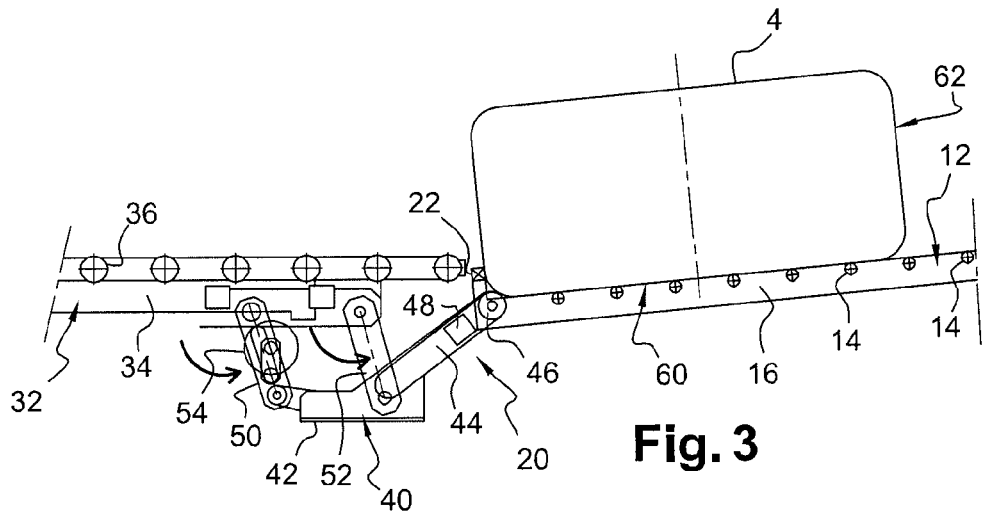
Figure 4:
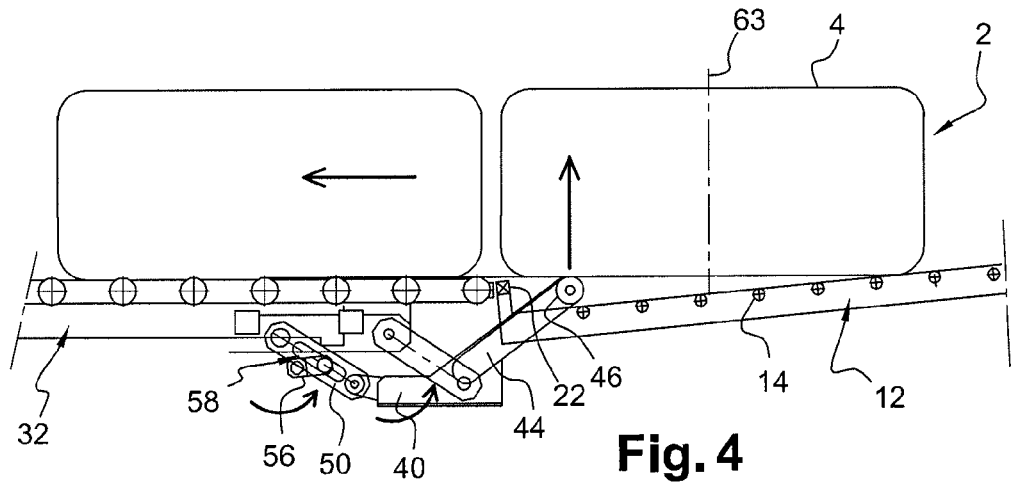

With reference to FIGS. 2 to 4, the platform of the exit conveyor 32 contains a frame 34 and mutually identical rollers 36 mounted freely mobile in rotation in relation to the frame 34, in such a way that the rollers define a plane horizontal surface intended to receive a casing 4.

The platform 32 contains a support 40 formed in the present case by a carriage in a single piece exhibiting a base 42 and two identical arms 44 extending one behind the other in FIGS. 2 to 4, each in a vertical plane inclined in relation to the vertical direction. The two arms 44 are parallel one with the other. The arms are rigidly connected to the carriage 40 by their lower extremity, and at their upper extremity they carry a roller 46 rotatably mounted about a horizontal axis in relation to the arms. The carriage 40 also comprises a motor 48 adapted to set the roller 46 in rotation.

The carriage 40 is connected to the frame 34 by means of a parallelogram mounting thus containing on each side of the carriage two rods 50 and 52, one parallel to the other, that is to say four rods in all, of which the axes of rotation are horizontal and are all parallel. The upper extremity of each rod is articulated on the frame 34, whereas its lower extremity is articulated on the carriage. The assembly formed by the carriage and the arms supporting the roller is thus mobile in translation in relation to the frame 34 of the platform, in particular in the vertical direction. The trajectory of this movement is circular and is inscribed in a vertical plane.

The carriage is mobile between a retracted position or an initial position illustrated in FIGS. 2 and 5, in which it extends in its entirety underneath the platform 32, the roller 46 extending perpendicularly to the roller 36 forming the extremity of the platform, and a final position or an extended position illustrated in FIGS. 4 and 5, in which the carriage has been displaced towards the right in the figures in relation to the initial position, and the roller 46 extends in the prolongation of the rollers 36, beyond that which forms the extremity of the platform. The roller 46 then extends the casing support plane of the platform.

The roller 46 has a length greater than half the width of the available channel for the casings. Here, this length exceeds three quarters of this width and even 90% of it. It is nevertheless smaller than this width in order to permit the roller to penetrate into the channel from underneath, as explained below.

The conveyor contains a motor 54, of which the casing is attached rigidly to frame 34, and which carries on its shaft, mounted movably about a horizontal axis, a rod 56 perpendicular to the said axis and supporting a roller accommodated in a sliding manner in a rectilinear groove 58 in the rod 50 which passes through it from one end to the other in the horizontal direction and extends parallel to the longitudinal direction of the rod. The rotation of the shaft of the motor, which is off-centred in relation to the axes of the rod, thus causes the roller to actuate the latter in its groove 58 causing it to rotate, which displaces the carriage 40 from one of its positions to the other.

The store 2 is utilized as follows, in particular for the implementation of the method according to the invention.

After curing the tire blanks 4, these are brought by the conveyor 6 as far as the store 2. The casings rest on the conveyor via a sidewall 60 of the tire. The entry conveyor 28 receives one of these casings on its platform and is then displaced as far as the upper extremity of its destination channel 12. Appropriate means, which are not described in detail here, then transfer the casing 4 onto the channel 12.

The casing, still resting on its sidewall, descends by gravity and by rolling on the rollers 14 by travelling for all or part of the length of the channel until it comes into abutment either against the end stop 22 of the lower extremity, or against the casings that have already accumulated in the lower part of the channel. The casings arriving via the conveyor 6 are thus stored successively in their destination channel. Sorting of the casings, which are grouped together by model and/or by series in the corresponding channels, takes place at this time. The axis 63 of the casing is inclined in relation to the vertical direction, taking into account the inclination of the channel.

If it is wished to remove one of these casings for the purpose of dispatching it to a client, the exit conveyor 32 moves as far as the lower extremity 20 of the channel where the casing 4 is present. The carriage 40 is initially in a retracted position as illustrated in FIG. 2, such that it does not impede the movement of the conveyor 32 with regard to the channels. The conveyor is placed in a position such that the plane defined by the rollers 36 is very slightly higher than the top of the end stop 22.

The setting in rotation of the roller 46 is then controlled by means of the motor 48 and the rotation of the motor 54. The latter causes the carriage 40 to pass from the initial position to the intermediate position illustrated in FIG. 3, in which the roller 46 is on the point of coming into contact with the casing 4. This contact takes place, for example, against the sidewall 60 on which the casing rests or at the junction of this sidewall with the tread 62.

The passage from one to the other of the positions takes place for the roller, as for the support, by means of a translation movement according to a circular trajectory inscribed in a vertical plane, the centre of the arc of the circle being situated above the trajectory. In the course of this movement, the roller 46 passes underneath the end stop 22 and penetrates from bottom to top into a transcurrent opening 27 provided close to the lower extremity of the channel 12 in order to permit the roller 46 to come in to contact with the casing 4 that is still resting in the channel. This opening is provided in the loading plane of the channel and is delimited towards the front by the end stop 22 and towards the rear by the first roller 14 of the channel following the end stop. The distance between the arms 44 is sufficiently small in relation to the distance between the longitudinal members of the frame 16 carrying the rollers 14 to permit the passage of the arms and of the roller 46 through this opening.

It may be proposed as a variant, however, that the roller 26 penetrates into an opening in the channel arranged between two of its rollers 14 in such a way that this opening is not contiguous with the end stop 22.

In the course of the rest of the movement, the carriage passes from the intermediate position in FIG. 3 to the final position in FIG. 4. It thus lifts the lower extremity of the casing 4 to a height greater than that of the end stop 22, as can be seen in FIG. 4. What is involved here is a rotation of the casing about a horizontal axis. The casing 4 in this case extends with its vertical axis 63, for example, and is also not inclined in relation to the vertical direction, as was the case during its storage in the channel.

The rest of this movement of the roller and of the support takes place by the continuation of the aforementioned translation according to the circular trajectory. The arms 44 penetrate higher into the opening in order to permit the roller 46 to lift the casing.

This movement is then interrupted.

The rotation of the roller 46, which now supports the casing 4 in part, then causes its transfer by sliding onto the platform 32 in such a way that the casing leaves the channel.

The conveyor 32 is then displaced as far as the exit conveyor 8, onto which the casing 4 is discharged by appropriate means.

The casings may then be subjected to a quality control stage if this has not already taken place before storing in the store. The casings are grouped together by series and/or by model for dispatch to a client.

The extremities of the travel of the roller 46 in relation to the platform correspond to the positions depicted in FIGS. 2 and 4. The parallelogram mounting is arranged in such a way that, regardless of the position of the roller on this travel, the rods 50 and 52 and the support 40 extend lower than the loading plane of the platform, thus leaving the latter clear at all times.

It should be noted that the store is organized in such a way that a casing introduced first into a given channel is necessarily the one which exits first. This is accordingly storage of the "first in-first out" type. A store of this kind permits the casings 4 to be withdrawn in a different order from their order of arrival.

In this example, the platform has dimensions allowing it to receive two casings one behind the other.

The store is adapted in particular for passenger vehicle tire casings exhibiting a diameter between 550 and 800 mm.

Numerous modifications can, of course, be made to the invention without departing from its framework.

The invention claimed is:

1. A store for vehicle tire casings comprising:
   at least two channels for storing casings, each having a rectilinear end stop, intercepting a median vertical plane of the channel, exhibiting two longitudinal extremities and being uninterrupted from one to the other of the extremities; and
   a casing conveyor configured for coming into alignment with any of the channels and containing a platform configured for receiving a casing and means for lifting a casing that is located in the channel to a height greater than that of the end stop, the means containing a roller which is mounted movably in the vertical direction in relation to the platform.

2. The store according to claim 1, wherein the roller is movably mounted in translation in relation to the platform.

3. The store according to claim 1, wherein the roller is movably mounted in relation to the platform in such a way as to pass through an opening arranged in each channel.

4. The store according to claim 1, wherein the roller is connected to the platform by a parallelogram mounting.

5. The store according to claim 4, wherein the mounting defines two extremities of the travel of the roller and extends in its entirety beneath a loading plane of the platform regardless of the position of the roller.

6. The store according to claim 1, further comprising means for displacing the roller in relation to the platform.

7. The store according to claim 1, wherein the means for lifting the casing contain a support, the roller being rotatably mounted in relation to the support.

8. The store according to claim 7, further comprising means for setting the roller in rotation in relation to the support.

9. The store according to claim 1, wherein the roller exhibits a length greater than half the width available in the channel for the casings.

10. The store according to claim 1, wherein the end stop extends for more than half the width available in the channel for the casings.

11. The store according to claim 1, wherein each channel is inclined in such a way that a casing received in one of the channels tends to move as far as the end stop.

12. The store according to claim 1, further comprising a second casing conveyor, adapted to come into alignment with an extremity of any of the channels opposite the end stop.

13. A method for handling vehicle tire casings, comprising:
    displacing a casing conveyor as far as a channel for storing casings, and
    with the conveyor, lifting a casing that is present in the channel to a height greater than that of an end stop of the channel, said end stop being a rectilinear end stop, intercepting a median vertical plane of the channel, exhibiting two longitudinal extremities and being uninterrupted from one to the other of the extremities.

14. The method according to claim 13, wherein the conveyor transfers the casing onto the conveyor.

15. The store according to claim 1, wherein the platform is configured to be displaced so that it is aligned with one of the at least two channels.

* * * * *